United States Patent [19]
Okamoto et al.

[11] 3,935,645
[45] Feb. 3, 1976

[54] APPARATUS FOR INDICATING RELATIVE AZIMUTH

[75] Inventors: Michio Okamoto, Fujisawa; Shigeru Izawa, Musashino; Michio Hara, Tokyo, all of Japan

[73] Assignee: Kabushiki Kaisha Komatsu Seisakusho, Japan

[22] Filed: Aug. 13, 1974

[21] Appl. No.: 497,045

Related U.S. Application Data

[63] Continuation-in-part of Ser. No. 171,133, Aug. 12, 1971, abandoned.

[30] Foreign Application Priority Data

Aug. 13, 1970 Japan............................... 45-70393

[52] U.S. Cl.................. 33/363 R; 33/267; 340/198
[51] Int. Cl.² ................... G01C 17/26; G08C 19/00
[58] Field of Search ............ 33/267, 351, 352, 363; 340/198, 315

[56] References Cited
UNITED STATES PATENTS

| | | | |
|---|---|---|---|
| 1,215,425 | 2/1917 | Sperry | 33/267 |
| 1,296,439 | 3/1919 | Sperry | 340/198 |
| 1,814,842 | 7/1931 | Murphy | 33/267 |
| 1,850,640 | 3/1932 | Sperry et al. | 340/198 |
| 3,119,189 | 1/1964 | Hyne | 33/363 R |

*Primary Examiner*—Richard E. Aegerter
*Assistant Examiner*—Richard R. Stearns
*Attorney, Agent, or Firm*—Armstrong, Nikaido & Wegner

[57] ABSTRACT

An arrangement for indicating a relative azimuth between two objects remote from each other, such as a control station and a mobile unit remotely controlled by the station, on which are respectively mounted first and second synchronous transmitters for generating and transmitting their respective signals corresponding respectively to true azimuths of the station and the unit. The control station is further provided with a relative azimuth indicating device including outer stational and inner rotatable dials, a rotatable indicator, first and second synchronous receivers, each having means for effecting rotation by receiving one of the signals corresponding thereto, and means for transmitting the respective rotations of the receivers to the inner dial and the indicator, respectively. Thus, not only the relative azimuth between the control station and the mobile unit but also their respective true azimuths are simultaneously read on the device at a glance by a controller in the correlation of the outer and inner dials and the indicator.

3 Claims, 3 Drawing Figures

APPARATUS FOR INDICATING RELATIVE AZIMUTH

CROSS REFERENCE TO RELATED APPLICATION

This application is a Continuation-In-Part application of our prior U.S. patent application Ser. No. 171,133 now abandoned filed Aug. 12, 1971 entitled APPARATUS FOR INDICATING A RELATIVE AZIMUTH ANGLE.

BACKGROUND OF THE INVENTION

1. Field of the Invention

This invention relates to an arrangement for indicating a relative azimuth between two objects remote from each other, such as a control station, for example, a ship on the sea and a mobile unit, for example, an under-water bulldozer, more particularly to an arrangement for indicating not only the relative azimuth between the control station and the mobile unit but also their respective true azimuths or bearings.

2. Description of the Prior Art

It becomes sometimes necessary to find respective true azimuths or bearings of two objects remote from each other and, at the same time, to obtain the relative azimuth therebetween when the two objects are remotely disposed in such a manner that they can change their respective azimuths or bearings freely. In particular, when one object is a control unit or station while the other object is a mobile unit remotely controlled by the control unit or station, it is absolutely necessary to find the relative azimuth between them in operation. In the conventional arrangement, the true azimuths or bearings of the two objects are separately indicated and hence it is difficult to read simultaneously them and to find out the relative azimuth therebetween immediately and at a glance.

SUMMARY OF THE INVENTION

It is an object of the present invention to provide a novel arrangement for indicating a relative azimuth between two objects remote from each other, such as a control station, for example, a ship on the sea and a mobile unit remotely controlled by the station, for example, an under-water bulldozer.

It is another object of the present invention to provide a device, adapted in the arrangement, for indicating simultaneously not only the relative azimuth between the control station and the mobile unit and their respective true azimuths or bearing thereon so that the relative azimuth between them and their respective true azimuths are read at a glance by a controller for the purpose of facilitating to control the mobile unit from the control station.

According to one embodiment of the present invention, there is provided an arrangement for indicating a relative azimuth between two objects remote from each other, such as a control station and a mobile unit remotely controlled by the control station, which includes first and second detectors mounted respectively on the control station and the mobile unit for detecting their respective true azimuths; first and second synchronous transmitters mounted respectively on the control station and the mobile unit for generating and transmitting their respective signals corresponding respectively to the true azimuths of the control station and the mobile unit detected by the true azimuth detectors; and a relative azimuth indicating device mounted on the control station for indicating thereon the relative azimuth between the control station and the mobile unit and, at the same time, their respective true azimuths. The device has a frame installed in the control station for protecting and supporting other elements constituting the device; a transparent window fitted in front of the frame; an outer stational dial equally graduated and fixedly secured to the frame inside the window and having a mark thereon to which the direction of head of the control station is aligned; an inner rotatable dial equally graduated and disposed concentrically with the outer stationary dial and having a hollow rotary shaft; a rotatable indicator extending to and over the outer stationary dial which has at the intermediate part thereof an arrow shaped member for indicating the graduation of the inner rotatable dial and which has a rotary shaft fixedly secured thereto and inserted concentrically with and within the hollow rotary shaft of the inner rotatable dial; a first synchronous receiver having therein a rotary shaft and means for providing the rotary shaft thereof with rotation by receiving the signal corresponding to the true azimuth of the control station and transmitted from the first synchronous transmitter; a second synchronous receiver having therein a rotary shaft and means for providing the rotary shaft thereof with rotation by receiving the signal corresponding to the true azimuth of the mobile unit transmitted from the second synchronous transmitter; and means for transmitting said rotations of the first and second synchronous receivers to the inner rotatable dial and the rotatable indicator, whereby the true azimuth of the control station is represented on the graduation of the inner rotatable dial indicated by the mark provided on the outer stationary dial, and that of the mobile unit is represented on the graduation of the inner rotatable dial indicated by the arrow shaped member provided in the intermediate part of the rotatable indicator, and further the relative azimuth between the control station and the mobile unit is represented on the graduation of the outer stationary dial indicated by the leading end of the rotatable indicator.

Thus, according to the arrangement of the present invention a controller can simultaneously read at a glance not only the respective true azimuths of the control station and the mobile unit but also the relative azimuth therebetween on the relative azimuth indicating device.

BRIEF EXPLANATION OF THE DRAWINGS

These and other objects, features and advantages of the present invention will become apparent from the following description taken in conjunction with the accompanying drawings in which.

DETAILED DESCRIPTION OF THE PREFERRED EMBODIMENTS

Figure 1:
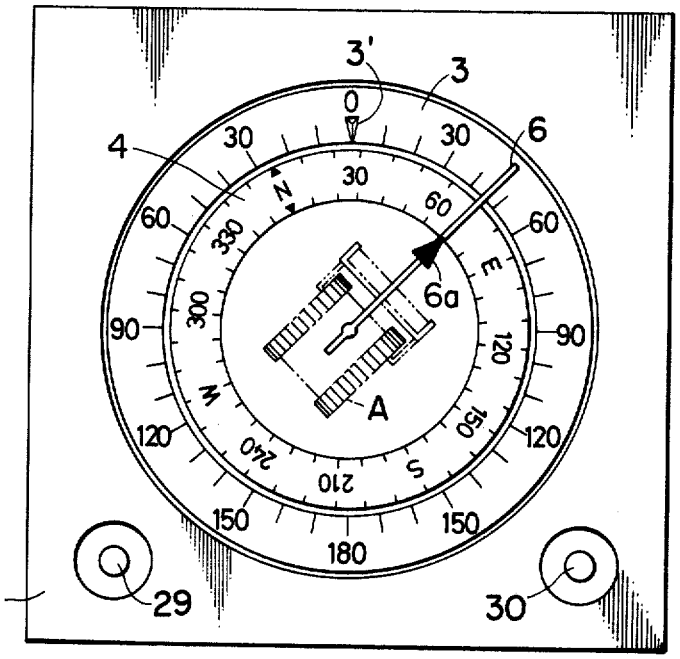
FIG. 1 is a front view of one embodiment of a relative azimuth indicating device for use in an arrangement for indicating a relative azimuth between two object remote from each other according to the present invention.

Reference is now made to the drawings, and particularly to FIG. 1 showing a front view of a relative azimuth indicating device according to one embodiment of the present invention, which can be used for a system in which a control station (not shown), such as, for example, an engine room in a ship on the sea, monitors the operation of a mobile unit (not shown), such as, for example, an under-water bulldozer, remotely controlled by the control station. Reference numeral 1 represents a frame for protecting and supporting other elements consisting the device. Numeral 2 denotes a transparent window, 3 an outer stationary dial equally graduated and having a mark 3' provided on the outer dial to which the head direction of the control station is aligned. Reference numeral 4 represents an inner rotatable dial equally graduated and disposed concentrically with and within the outer stationary dial 3. The inner dial 4 is adapted to turn upon receiving an electric signal corresponding to the true azimuth or bearings of the control station detected by a true azimuth detector (not shown), for example, a magnetic compass mounted on the station from a synchronous transmitter (not shown) mounted on the station and adapted to generate and transmit the electric signal depending upon the operation of the true azimuth detector so as to clearly indicate the true azimuth or bearings of the control station. Stating more clearly, the true azimuth or bearings of the control station can be obtained by reading the graduation of the inner rotatable dial 4 which is indicated by the mark 3' provided on the outer stationary dial 3. Reference numeral 6 denotes a rotatable indicator extending to and over the outer stationary dial 3 and disposed coaxially with the inner rotatable dial 4 for indicating the true azimuth or bearings of the mobile unit. Namely, the rotatable indicator 6 is adapted to turn upon receiving an electric signal corresponding to the true azimuth of the mobile unit detected by a true azimuth detector (not shown), for example, a magnetic compass mounted on the mobile unit from a synchronous transmitter (not shown) mounted on the unit and adapted to generate and transmit the electric signal depending upon the operation of the detector so as to clearly indicate always the true azimuth or bearings of the mobile unit and the relative azimuth between the control station and the mobile unit. Stating in more detail, the true azimuth or bearings of the mobile unit can be obtained by reading the graduation of the inner dial 4 which is indicated by an arrow-shaped member 6a provided in the intermediate part of the indicator 6. On the other, the relative azimuth between the control station and the mobile unit can be seen by reading the graduation of the outer stationary dial 3 which is indicated by the leading end of the indicator 6. Further, in the above described embodiment according to the present invention, if the indicator 6 is used in combination with an indicating plate A on which is illustrated a picture of the mobile unit, such as, for example, an under-water bulldozer, as shown in FIG. 1, it is convenient for the operator to find immediately the direction of the mobile unit in relation to that of the control station which can be found by the mark 3' provided on the outer stationary dial 3.

Figure 2:
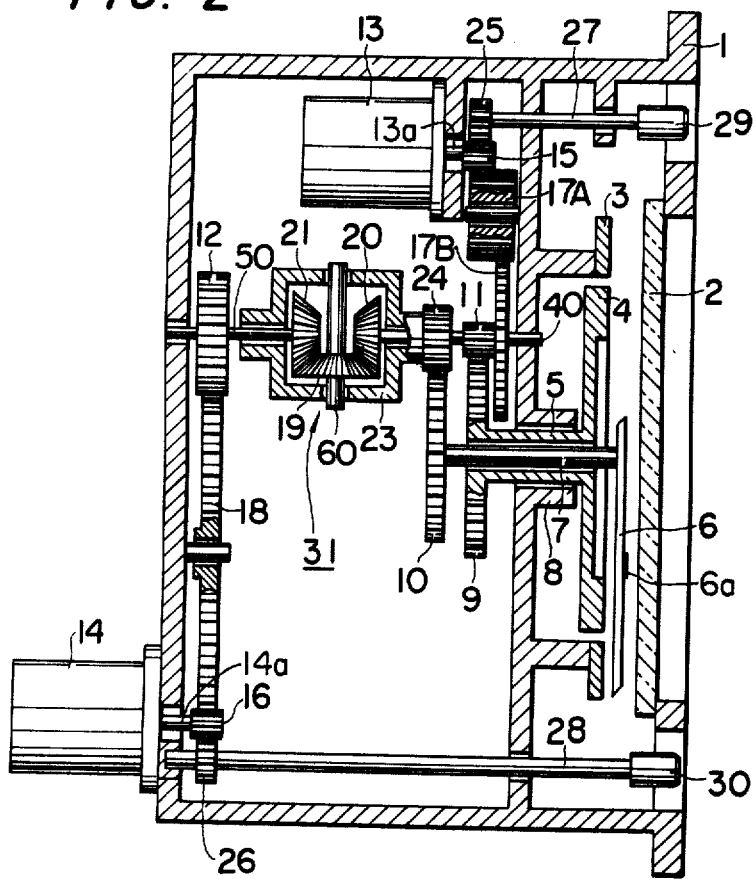
FIG. 2 is a side elevational sectional view showing the interior mechanism, as one embodiment, of the device shown in FIG. 1 for explaining the operation thereof.

Referring now to FIG. 2, which is a side elevational sectional view of the internal mechanism of the device shown in FIG. 1 for explaining the operation thereof, a hollow shaft 5 carries therewith the inner dial 4 and is freely rotatable relative to a bearing part 8 of the frame 1. The indicator 6 is fixedly secured to a shaft 7 and is adapted to be rotated freely and coaxially with the inner dial 4, said shaft having a gear 10 fixed thereto at the end thereof opposite to the indicator 6. A gear 11 is engaged with a gear 9 which is fixedly secured to one end of the hollow shaft 5. A shaft 40 having the gear 11 at one end thereof has a first bevel gear 20 fixedly secured thereto at the other end thereof. In the similar manner, a shaft 50 having a gear 12 at one end thereof has a second bevel gear 21 fixedly secured thereto at the other end thereof. Both the first and second bevel gears 20 and 21 are engaged with an intermediate bevel gear 19 so as to constitute a differential gear unit 31 together with a differential gear frame 23. Thus, a shaft 60 to which is fixedly secured the intermediate bevel gear 19 is carried by the differential gear frame 23 so that the gear frame 23 can be freely rotated around the bevel gears 20 and 21 with respect to the axes of the shafts 40 and 50 by the interposition of the bevel gear 19 and the shaft 60. A differential response gear 24 is fixedly secured to one end of the differential gear frame 23, and the gear 24 is always engaged with the gear 10. Reference numeral 13 represents a synchronous receiver having a rotary shaft 13a and means for providing the shaft 13a with rotation by receiving the signal corresponding to the true azimuth of the control station and transmitted from the first synchronous transmitter mounted on the control station. The rotary shaft 13a is fixedly secured to a first pinion gear 15 which engages with a gear 17B through an idle gear 17A. Reference numeral 14 is another synchronous receiver having also a rotary shaft 14a and means for providing the shaft 14a with rotation by receiving the signal corresponding to the true azimuth of the mobile unit and transmitted from the second synchronous transmitter mounted on the mobile unit. The rotary shaft 14a fixedly secured a second pinion gear 16 which engages with the gear 12 through an idle gear 18. Reference numeral 25 denotes a correction gear which engages with the first pinion gear 15 and is connected through a shaft 27 rotatably supported by the frame 1 of the device to a correction knob 29 which is disposed in the front face of the device so as to be manually operated. When a discrepancy is caused on the inner dial 4 by an external factor, i.e., vibration, etc., that is, in case that the true azimuth of the control station represented with the graduation of the inner dial 4 indicated by the mark 3' provided on the outer dial 3 does not correspond to the correct one, it is rectified by turning the correction knob 29. Reference 26 is another correction gear which engages with the second pinion gear 16 and is connected through a shaft 28 rotatably supported by the frame 1 of the device to a correction knob 30 which is disposed in the front face of the device so as to be manually operated. When a discrepancy is caused on the rotatable indicator 6 by such external factor, that is, in case that the true azimuth of the mobile unit represented with the graduation of the inner dial 4 indicated by the arrow shaped member 6' provided in the intermediate part of the indicator 6 does not correspond to the correct one, it is rectified by turning the correction knob 30.

Whereupon, as to the gear ratio, that is, the speed ratio of each of the gears, it is so arranged as described below.

In one embodiment, the speed ratio of the first pinion gear 15 to the gear 17B is arranged at 4 : 1 through the idle gear 17A, and also that of the second pinion gear 16 to the gear 12 is set at 4 : 1 through the idle gear 18. While, the speed ratio of the gear 11 to the gear 9 is set at 9 : 1, and the speed of the differential response gear 24 to the gear 10 is set at 4.5 : 1. And, the operation of the differential gear unit 31 is explained as follows. In case of that one of the bevel gears 20 and 21 is rotated and the other is not rotated, the bevel gear 19 itself is rotated at the same speed as the bevel gear 20 or 21 and the same is rotated around the bevel gears 20 and 21 along the circumferences of them together with the differential gear frame 23 including the differential response gear 24 at the same speed as the bevel gears 20 and 21. And, when the bevel gears 20 and 21 are rotated at the same speed and in the opposite direction, the bevel gear 19 itself is not rotated and the same is not rotated around the bevel gears 20 and 21, therefore, the differential response gear 24 is not rotated also.

Figure 3:
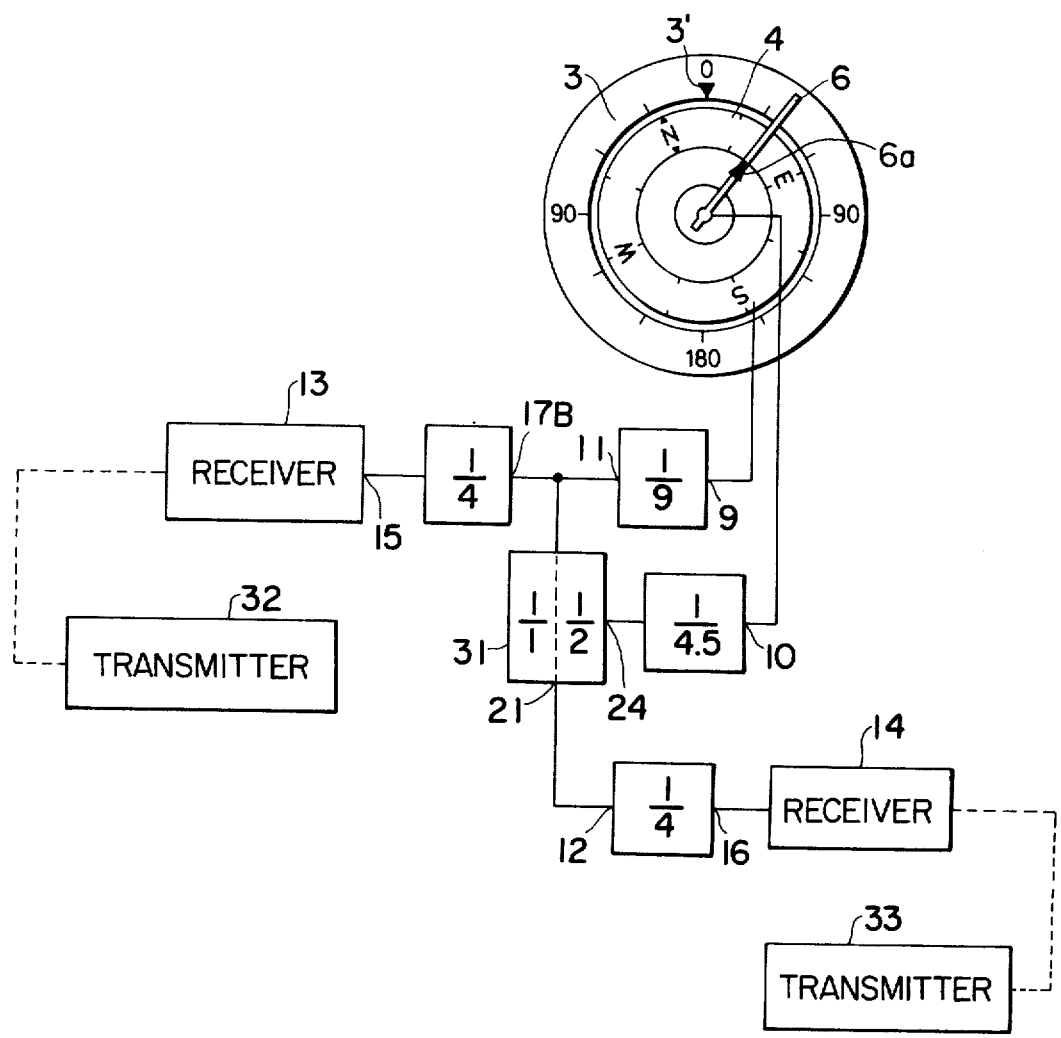
FIG. 3 is a block diagram for explaining an azimuthal information transmitting system of the arrangement according to the present invention.

FIG. 3 shows a block diagram for explaning one embodiment of the system for transmitting informations on the respective true azimuths of the control station (not shown) and the mobile unit (not shown) remotely controlled by the control station from their respective synchronous transmitters to the relative azimuth indicating device in the foregoing arrangement according to the present invention. The figures in blocks represent the speed ratios of gears as they are described hereinbefore. Reference numerals 32 and 33 denote the first and second synchronous transmitters mounted on the control station and the mobile unit, respectively. As is clear from FIG. 3, the speed ratio of the inner rotatable dial 4 to the pinion gear 15 rotated by the first synchronous receiver 13 is set at 1 : 36, and that of the rotatable indicator 6 to the pinion gear 16 rotated by the second synchronous receiver 14 is set at 1 : 36 or 1 : 18. This reduced rate of 1/36 is given for the purpose of reducing possible errors on the speed ratio caused in the synchronous transmission system, whilst it is a matter of course that the first and second synchronous transmitters 32 and 33 generate and transmit their respective signals, each effecting the rotation having a speed increased at 36 times of each of the true azimuths of the control station and the mobile unit.

Now, the practical operation of the foregoing arrangement according to the present invention is explained as follows.

When only the control station is displaced on its true azimuth or bearings, the rotation effecting means within the first synchronous receiver 13 is rotated at a rotation angle, which is 36 times of that of the control station depending upon the displacement thereof, by receiving a signal corresponding to the new true azimuth of the control station and transmitted from the first synchronous transmitter 32. The rotation is transmitted at a reducing rate of 1/36 to the hollow shaft 5 to turn the inner dial 4 at a rotation angle corresponding to that of the control station through the gears 15, 17A, 17B, 11 and 9. Therefore, the new true azimuth of the control station can be easy found reading the graduation of the inner dial 4 indicated by the mark 3' provided on the outer stationary dial 3. In this case, the bevel gear 20 is rotated, but the bevel gear 21 remains stationary. As a result, the bevel gear 19 is rotated by the bevel gear 20 and, at the same time, drives the differential gear frame 23 including the differential response gear 24 at a speed ratio of one-second so as to turn the indicator 6 through the gear 10 at the same rotation angle and in the same direction as that of the inner dial 4. Accordingly, the true azimuth of the mobile unit has been held in the same as it was before on the inner dial 4 indicated by the indicator 6.

When only the mobile unit is displaced on its true azimuth or bearings under the control of the control station, the rotation effecting means within the second synchronous receiver 14 is rotated in a similar manner as in the first synchronous receiver. In this case, the bevel gear 21 is rotated, while the bevel gear 20 remains stationary. As a result, the bevel gear 19 is rotated by the bevel gear 21 and, at the same time, drives the differential gear frame 23 at a speed ratio of one-second upon rotating around the bevel gears 20 and 21 along their circumferences so as to turn the indicator 6 through the gear 10 at a rotation angle corresponding to that of the mobile unit depending upon its displacement, while the inner dial 4 remains stationary.

In the above cases, either the control station or the mobile unit is displaced on its true azimuth or bearings are described, but cases where both the two are displaced on their respective true azimuths or bearings at the same time will now be described below.

When the two are displaced on their respective true azimuth or bearings simultaneously with each other at the same angle and in the same direction, the bevel gears 20 and 21 are rotated in the directions opposite to each other, so that the bevel gear 19 is rotated by the bevel gears 20 and 21 without having any frictional resistance, therefore its rotation is not transmitted to the differential gear frame 23. For this reason, the indicator 6 remains stationary, while only the inner dial 4 connected to the bevel gear 20 is rotated. This indicates that the relative azimuth between the control station and the mobile unit have been held in the same as it was before and hence their respective true azimuths or bearings are changed at the same angle with each other.

Then, if the control station and the mobile unit are displaced simultaneously with each other at the same angle in the directions opposite to each other, the bevel gears 20 and 21 are rotated at the same angle and in the same direction with each other so that the bevel gear 19 is not allowed to rotate, thereby rotating the differential gear frame 23 integrally with the bevel gears 20 and 21 at a speed ratio of 1 : 1. While, the speed ratio of the differential response gear 24 to that of the gear 10 is set at 4.5 : 1, and that of the gear 11 to the gear 9 is set at 9 : 1. Therefore, the indicator 6 is rotated at a rotation angle twice of that of the inner dial 4 in the same direction as that of the inner dial 4. This means that if the control station should turn clockwise from the original true azimuth thereof at an angle of 20°, the mobile unit would turn counterclockwise by an angle of 20° from its original true azimuth.

As is clear from the foregoing, the present invention is advantageous particularly in that the arrangement according to the present invention is extremely useful for indicating the respective directions of two objects remote from each other, such as a control ship on the sea and an under-water bulldozer controlled by the control ship, and is adapted to indicate the respective true azimuths of the control ship and the under-water bulldozer and also to indicate the relative azimuth therebetween on one and the same indicating device, thereby facilitating extremely the control of the under-water bulldozer.

In the above-mentioned embodiment of the present invention, a differential gear unit operated mechanically is employed, but a differential synchronous mechanism actuated electrically can also be used for achieving the same purpose.

What is claimed is:

1. An arrangement for indicating a relative azimuth between two objects remote from each other, such as a control station having therein a first detector for detecting a true azimuth thereof and a mobile unit remotely controlled by the control station which has therein a second detector for detecting a true azimuth thereof, comprising:

a first synchronous transmitter mounted on the control station for generating and transmitting a signal corresponding to the true azimuth of the control station detected by said first azimuth detector; a second synchronous transmitter mounted on the mobile unit for generating and transmitting a signal corresponding to the true azimuth of the mobile unit detected by said second true azimuth detector;

a frame installed in the control station for protecting and supporting other elements constituting said device;

a transparent window fitted in front of said frame;

an outer stationary dial equally graduated and fixedly secured to the frame inside the window and having a mark thereon aligned with the direction of heading of the control station;

an inner rotatable dial equally graduated and disposed concentrically with said outer stationary dial and including a hollow rotary shaft;

a rotatable indicator extending to and over said outer stationary dial and having at the intermediate part thereof an arrow shaped member for indicating the graduations of the inner inner dial and having a rotary shaft fixedly secured thereto and inserted concentrically within said hollow rotary shaft of said inner rotatable dial;

a first synchronous receiver having therein a rotary shaft and means for providing the rotary shaft with rotation by receving the signal transmitted from said first synchronous transmitter mounted on the control station;

a second synchronous receiver having therein a rotary shaft and means for providing the rotary shaft with rotation by receiving the signal transmitted from said second synchronous transmitter mounted on the mobile unit; and means for transmitting said rotations of said first and second synchronous receivers to said inner rotatable dial and the rotatable indicator such that the true azimuth of the control station is represented on the graduation of said inner rotatable dial indicated by said mark provided on said outer stationary dial, and that of the mobile unit is represented on the graduation of said inner rotatable dial indicated by said arrow shaped member provided in the intermediate part of said rotatable indicator, and moreover the relative azimuth between the control station and the mobile unit is represented on the graduation of said outer stationary dial indicated by the leading and of said rotatable indicator.

2. The arrangement as set forth in claim 1, wherein said rotation transmitting means in said relative azimuth indicating device comprises a gear transmitting mechanism consisting of:

a first pinion gear fixedly secured to one end of said rotary shaft of said first synchronous receiver;

a first idle gear meshed with said first pinion gear;

a first year meshed with said first idle gear and having a first shaft fixedly secured thereto and rotatably supported by said frame of said device;

a second gear fixedly secured to said shaft;

a third gear fixedly secured to one end of said hollow rotary shaft of said inner rotatable dial;

a second pinion gear fixedly secured to one end of said rotary shaft of said second synchronous receiver;

a second idle gear meshed with said second pinion gear;

a fourth gear meshed with said second idle gear and having a second shaft fixedly secured thereto and rotatably supported by said frame of said device;

a differential gear unit which is composed of a differential gear frame including a differential response gear, a first bevel gear fixedly secured to one end of said first shaft, a second bevel gear fixedly secured to one end of said second shaft, and an intermediate bevel gear meshed with said first and second bevel gears, said third bevel gear having a third shaft fixedly secured thereto and rotatably supported by said differential gear frame; and a fifth gear meshed with said differential response gear and fixedly secured to one end of said rotary shaft of said rotatable indicator:

whereby said first synchronous receiver is connected to said inner rotatable dial through said first pinion gear, first idle gear, first gear, second gear and third gear, and whereby said second synchronous receiver is connected to said rotatable indicator through said second pinion gear, second idle gear, fourth gear, said differential gear unit and fifth gear.

3. The arrangement as set forth in claim 1, wherein said relative azimuth detecting device further comprises:

a first correction means for correcting a discrepancy of said inner rotatable dial, that is, a discrepancy between the true azimuth of the control station represented with the graduation of said inner rotatable dial indicated by said mark provided on said outer stationary dial and the correct true azimuth of the control station, said first correcting means being composed of a correction gear meshed with said first pinion gear, a shaft fixedly secured to said correction gear at the one end thereof and rotatably supported by said frame of the device and a correction knob fixedly secured to the other end of said shaft and disposed in the front face of the device so as to be manually operated, and a second correction means for correcting a discrepancy of said rotatable indicator, that is, a discrepancy between the true azimuth of the mobile unit represented with the graduation of said inner rotatable dial indicated by said arrow shaped member provided in the intermediate part of said indicator and the correct true azimuth of the mobile unit, said second correcting means being composed of a correction gear meshed with said second pinion gear, a shaft fixedly secured to said correction gear at the one end thereof and rotatably supported by said frame of the device and a correction knob fixedly secured to the other end of said shaft and disposed in the front face of the device so as to be manually operated.

* * * * *